(No Model.)

P. G. HUBERT.
TIME VALVE.

No. 393,110. Patented Nov. 20, 1888.

Witnesses:
Arthur H. Gamblin.
C. E. Sundgren.

Inventor:
Philip Gengembre Hubert.
by attorneys
Brown & Griswold.

UNITED STATES PATENT OFFICE.

PHILIP GENGEMBRE HUBERT, OF NEW YORK, N. Y.

TIME-VALVE.

SPECIFICATION forming part of Letters Patent No. 393,110, dated November 20, 1888.

Application filed August 23, 1888. Serial No. 283,570. (No model.)

*To all whom it may concern:*

Be it known that I, PHILIP GENGEMBRE HUBERT, of the city and county of New York, in the State of New York, have invented a new and useful Improvement in Time-Valves, of which the following is a specification.

I will describe in detail a time-valve embodying my improvement, and then point out the novel features in claims.

Figure 1:
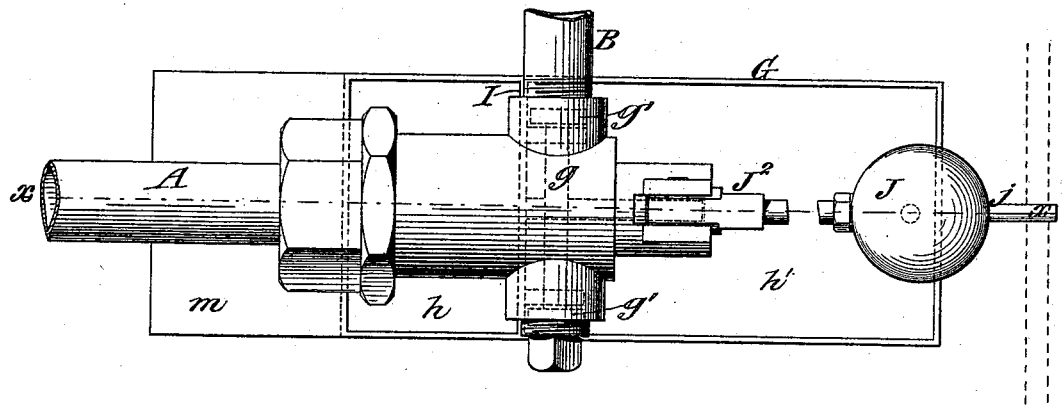
Figure 2:
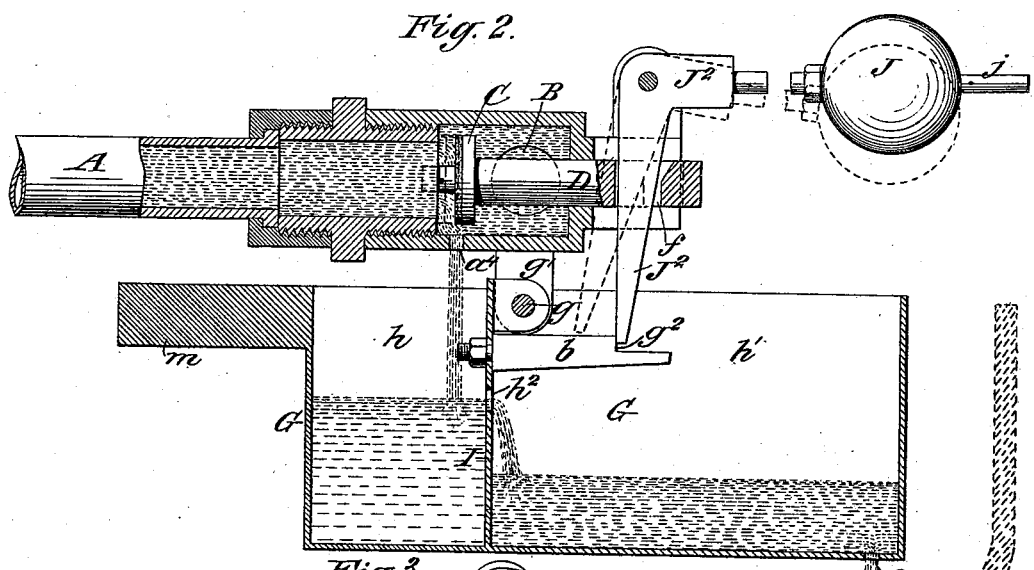
Figure 3:
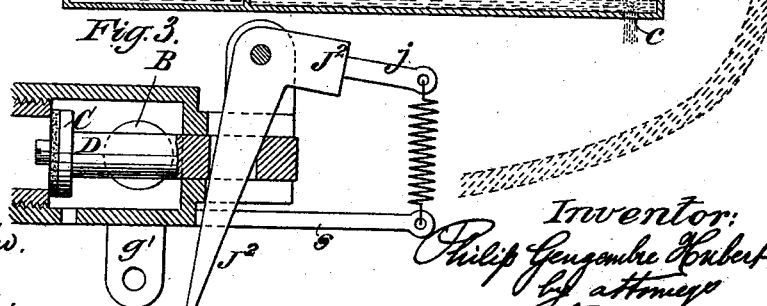

Figure 1 is a plan or top view of a time-valve embodying my improvement. Fig. 2 is a longitudinal section thereof, taken on the line $x\,x$ of Fig. 1; and Fig. 3 is a detail showing modified means for operating certain parts.

Similar letters of reference designate corresponding parts in the several figures.

A designates the supply-pipe for water. This supply-pipe connects with a union or coupling comprised in the valve-chest. Water passes through the union or coupling to the interior of the valve-chest. Such passage may, however, be closed by a valve, C. This valve is, as shown, mounted upon a spindle, D, near one end of the latter. The spindle works through a suitable bearing in the valve-chest.

Water from the supply-pipe A is delivered into the valve-chest and passes, when the valve C is open, through a passage, $a^4$, in the lower part of the valve-chest. From the passage $a^4$ the water falls into a box, G. The box G is adapted to tilt or rock. It is mounted upon a rod, $g$, in this example of my improvement shown as extending through suitable apertures in lugs $g'$, extending downwardly from the valve-chest.

The box G is divided into two compartments, $h\,h'$. Water from the valve-chest falls first into the compartment $h$ of the box G. After rising to a certain height it passes through an aperture, $h^2$, in a partition, I, separating the compartments $h\,h'$. After the water passes into the compartment $h'$ and reaches a certain height its weight causes the tilting or rocking of the box G upon its rod $g$. When this action occurs, the valve C will be closed.

In the example of my improvement shown I accomplish the closing of the valve in the following manner: J designates a weight. This weight is arranged upon a rod, $j$. The rod $j$ is connected near one end with a lever, $J^2$, (shown as a bell-crank lever,) which lever is fulcrumed upon the valve-chest. One arm of this lever extends downwardly through a suitable aperture, $f$, in the spindle D. Upon the box G is arranged a trip, $b$. This trip, in the example of my improvement shown, is secured near one end to the partition I, separating the compartments $h\,h'$ of the box G. Near its outer end it is provided with a notch, $g^2$. The downwardly-extending arm of the lever $J^2$ engages said notch when the box G occupies a horizontal position, and therefore holds the valve C open, so that water will pass from the valve-chest into the box G. When, however, the box G is tilted by the weight of water in the compartment $h'$, the trip $b$ is released from engagement with the lever $J^2$, and the weight J operates to rock the lever $J^2$ so as to move the spindle D longitudinally and thereby to close the valve C.

When the valve has been closed, the slow discharge of water from the compartment $h'$, which discharge may occur through an opening, $c$, into a water-closet bowl, occurs, and the box G will rock back into its normal position, or into that position shown more clearly in Fig. 2.

The rocking of the box G backwardly into its normal position may be assisted by a weight, $m$, secured upon the box G.

My improvement being adapted more particularly for use in water-closets and to form a time-valve for such use, I design that the closing of the valve shall occur after the act of flushing the closet-bowl has occurred, and the time-valve is more particularly adapted to that class of closets known as "tilting" or "rocking" closets. When the closet tilts or rocks in order to discharge the contents from the soil-compartment of the bowl, the edge of the bowl will come in contact with the rod $j$ and raise it in order to open the valve and occasion the reflushing of the bowl. Water to reflush the bowl may pass outwardly through a flushing-pipe, B.

It is obvious that a spring might be substituted for the weight J, as the equivalent thereof, for closing the valve.

I have shown in Fig. 3 a spring attached to the rod $j$ and also to an arm, $s$, extending from the valve-chest for accomplishing the purpose.

What I claim as my invention, and desire to secure by Letters Patent, is—

1. In a time-valve, the combination, with a weight or spring for closing the valve, of a tilting receptacle for water below the valve into which water is discharged from the valve, a trip for preventing the closing of the valve, said tilting receptacle for water operating upon the receipt of a certain quantity of water to release said trip and permit the closing of the valve, substantially as specified.

2. The combination, with a valve-chest, of a valve arranged therein, a spindle upon which said valve is mounted, a lever having a connection with said spindle, a tilting receptacle for water below said valve, a weight or spring operating to move said spindle in one direction, and a trip on the water-receptacle for preventing the operation of said weight, substantially as specified.

PHILIP GENGEMBRE HUBERT.

Witnesses:
FREDK. HAYNES,
ARTHUR H. GAMBLIN.